UNITED STATES PATENT OFFICE.

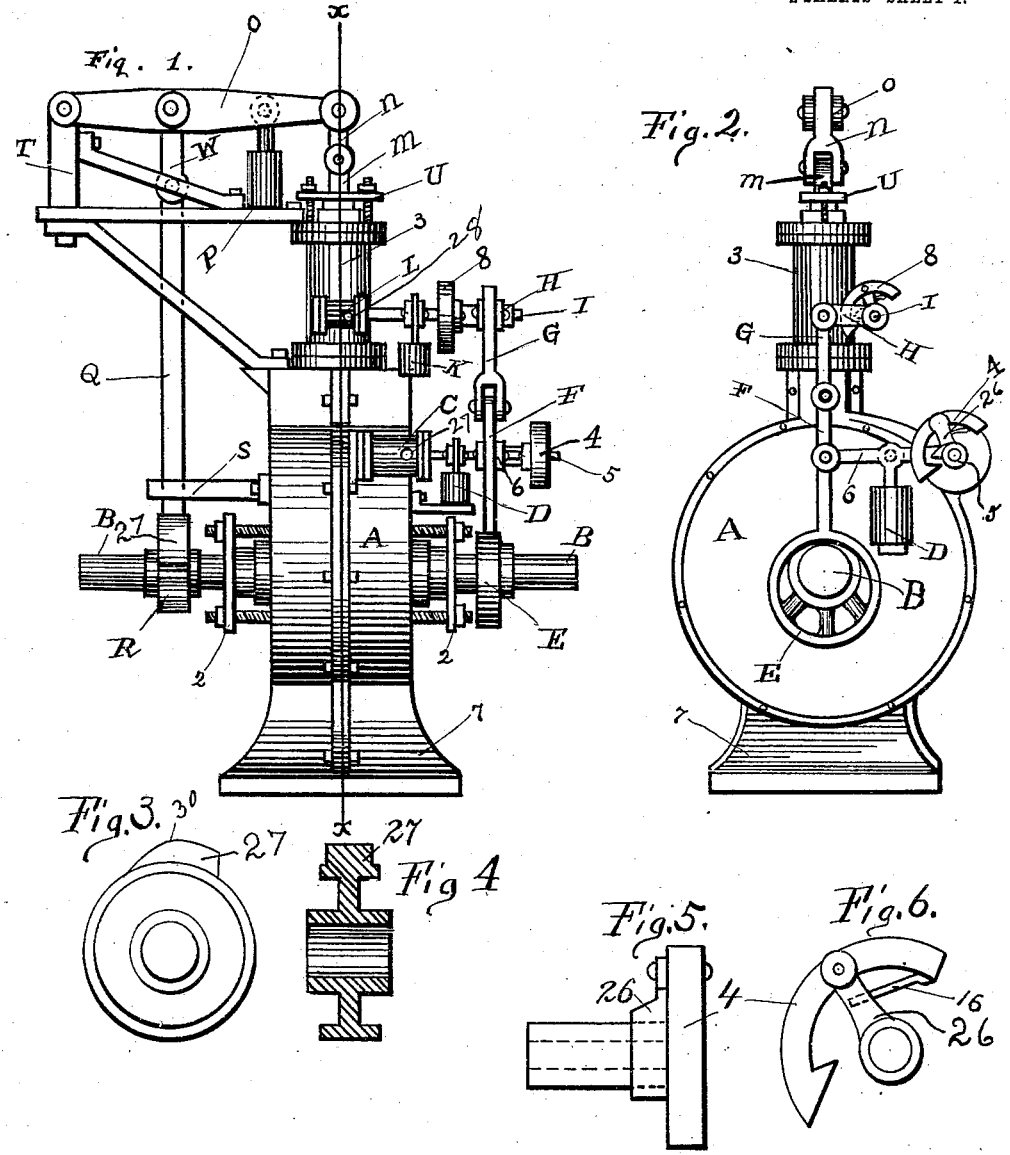

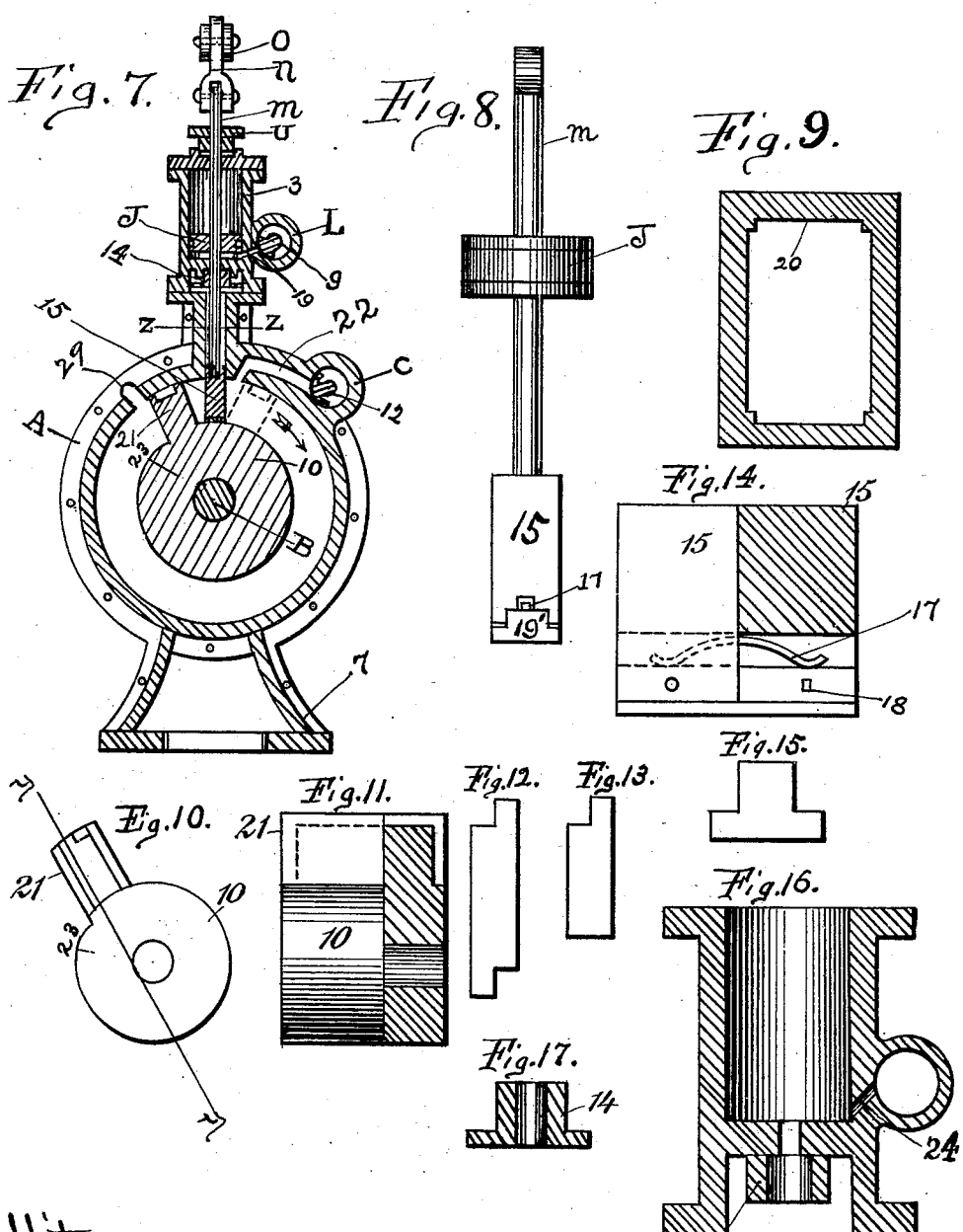

ARTHUR T. SNODGRASS, OF THOMASVILLE, GEORGIA.

ROTARY ENGINE.

No. 915,236.  Specification of Letters Patent.  Patented March 16, 1909.

Application filed January 17, 1908. Serial No. 411,285.

*To all whom it may concern:*

Be it known that I, ARTHUR T. SNODGRASS, a citizen of the United States, residing at Thomasville, in the county of Thomas and State of Georgia, have invented certain new and useful Improvements in Rotary Engines, of which the following is a specification.

My improvement relates to that class of engine in which a piston is rigidly attached to a main shaft, the piston and shaft being impelled in a circular motion by steam or other gaseous substance.

In many of the rotary engines now in use the speed at which the piston has to be propelled is so excessive that it is a difficult matter to maintain proper adjustment of the engine itself, as well as to reduce the speed to a speed which is practical in commercial usage.

The objects of my invention are, first, to provide a rotary engine which may be operated at a slow speed and still obtain efficient results; second, to produce a rotary engine which shall have efficient starting power; third, to construct an engine which shall reduce the consumption of steam to a minimum.

My improvements are shown in the accompanying drawings and are hereinafter more particularly described and claimed.

In the accompanying drawings, Figure 1 represents a side view of my engine, showing the connection of all valves, eccentrics, and levers used in the operation of the engine. Fig. 2 represents an end view of the engine, showing in part the operating devices. Fig. 3 is a side view of the cam for the raising of the back pressure plate of the engine. Fig. 4 is a sectional view of cam #27. Fig. 5 and Fig. 6 are enlarged views of trip hook #4 and #8 for the operation of the steam inlet valves #9 and #12. Fig. 7 is a sectional view of my engine taken through line X X of Fig. 1. Fig. 8 is an enlarged view of all the parts comprising the back pressure plate. Fig. 9 is a cross section taken through line Z Z of the case, into which the back pressure plate is raised to allow the passage of piston 21 when engine is in operation. Fig. 10 is an end view of piston 21 and hub 10. Fig. 11 is a side view in part sectional of piston 21 and hub 10. Figs. 12 and 13 are views of the packing rings employed upon piston 21. Fig. 14 is a side view in part sectional of back pressure plate 15. Fig. 15 is an end view of the spring packing employed in the back pressure plate. Fig. 16 is an enlarged sectional view of cylinder 3. Fig. 17 is a sectional view of packing gland 14.

Piston 21 is rigidly attached to shaft B, which extends clear through the engine and is supported at such points as may be necessary by journal boxes of any of the desirable forms now in use. To this shaft are attached all the eccentrics and other devices necessary for the operation of the engine.

In Fig. 1, A represents the main housing or shell in which piston 21 and hub 10 revolve.

C is a housing for the valve which admits steam into main shell A, #5 being the shaft to which is attached the main inlet valve. There is also attached to shaft 5 trip cam #4, as well as operating lever 6, and vacuum pot D.

8 is a cam, exactly similar to #4, which operates shaft I, to which is attached the valve which admits steam to cylinder 3.

M is the piston rod to which is attached back pressure plate 15, as shown in Fig. 7, this piston rod being actuated by steam in connection with the cam #27, through the medium of connecting link N, lever O, link W, and rod Q.

P represents a vacuum pot, of any of the designs now in common use, to prevent the jarring of piston M, as it is dropped in operation, which may be located as most desired.

27 is a cam, as shown in Fig. 3, which is is used as a safe guard to assure the raising of piston M, should at any time the steam fail to actuate this piston.

E is an eccentric, of any of the ordinary types now in use, for the purpose of operating the valves which admit steam into the engine, it being connected to these valves by means of the connecting rods F and G and the connecting levers H and 6, which in turn are connected to shafts 1 and 5.

K represents a vacuum pot for the prevention of any jarring as inlet valve to cylinder 5 is closed.

Numbers 2 and 2 are glands for stuffing boxes for the prevention of escape of steam around shaft B.

Number 7 represents the base upon which the engine rests.

In operation steam is admitted into valve shells L and C through pipes attached to these valve shells at any point desired, as at 27 and 28. The manner of admitting this steam varying according to the special use for which each engine is required, the steam is in turn admitted to passage 22 by the rotating of valve 12, which valve is rotated by the means of eccentric E. Steam flows through passage 22 into main housing A between piston 21 and back pressure plate 15, when piston 21 is in the position shown by the dotted lines in Fig. 7, piston 21 and hub 10, by the admission of this steam are forced around in the direction as shown by the arrow in Fig. 7 and the steam is held confined between back pressure plate 15 and piston 21. Steam is admitted in this manner until piston 21 has reached such a point that the expansion of the steam in housing A will be sufficient to complete the revolution with power, at which time valve 12 is closed, thus obtaining full expansion and all efficiency of the steam. When piston 21 has rotated, until it passes exhaust port 29, steam is immediately released through a pipe, or any other device, which may be desired, or if the engine is running as a compound engine, the steam passes through exhaust port 29 into the low pressure engine. When piston 21 has approached, nearly to, exhaust port 29 valve 9 is opened by means of eccentric E and trip cam 8, thus admitting steam into cylinder 3 underneath piston J, which piston by means of piston rod M is attached to back pressure plate 15. By this means a pressure is exerted to raise plate 15, which pressure is not quite sufficient to raise this plate while there is pressure against 15, due to steam expanding in housing A, but as soon as the pressure against plate 15 is relieved by piston 21 passing the exhaust port 29, it is immediately raised by the pressure under piston J until it is entirely clear of the main portion of housing A, thus allowing piston 21 to pass freely around until it again takes position as shown by dotted lines in Fig. 7. There being no outlet for the air which is contained in cylinder 3 above piston J, this air is compressed and thus forms a positive air cushion to prevent all jarring upon the machinery, as piston is forced up with great rapidity. If at any time valve 9 should fail to operate, eccentric cam 27, by means of its connection with lever O, will raise back pressure plate 15, thus preventing any possibility of an accident by pressure plate 15 not being raised in time to allow the free passage of piston 21. After pressure plate 15 has been raised by the steam injected under piston J, and eccentric cam 27 has revolved until point 30 has passed from under connection rod Q steam is allowed to exhaust from under piston J, and this piston is held in the raised position by means of the outer end of cam 27, which from point 30 is concentric with shaft B. In this manner it is impossible for plate 15 to, at any time, fall and come in contact with piston 21. After piston 21 has taken position as shown by the dotted lines in Fig. 7, eccentric cam 27 has passed from under connecting rod Q, piston J, together with piston rod M, and back pressure plate 15 are forced downward by means of the compressed air above piston J in connection with the suction formed by the raising of the plunger in vacuum pot P, and gravity of all parts attached, but jarring upon the engine is obviated through the cushion formed in vacuum pot P.

The operation as described above is repeated with every revolution of the engine and in this manner an engine of great power, smoothness of running, and economy in steam is obtained.

It is understood that I do not desire to be limited to the precise construction herein described but that changes may be made within the principles of construction indicated.

I claim:—

1. In a rotary engine, the combination of a rotating piston, rotating in an inclosing housing, a back pressure plate attached to a piston sliding in a cylinder and a cylinder closed hermetically above the piston, substantially as set forth.

2. In a rotary engine, the combination of a rotating piston, rotating in an inclosing housing, a back pressure plate impelled perpendicularly from a rotating hub by steam and impelled perpendicularly to a rotating hub by air, substantially as set forth.

3. In a rotary engine, the combination of a rotating piston, rotating in an inclosed housing, a back pressure plate impelled perpendicularly from a rotating hub by steam, impelled perpendicularly to a rotating hub by air, and a vacuum pot located above the actuating piston, substantially as set forth.

4. In a rotary engine, the combination of a rotating piston, rotating in an inclosing housing, a back pressure plate impelled perpendicularly from a rotating hub by steam, impelled perpendicularly to a rotating hub by air, a vacuum pot located above actuating piston and an auxiliary eccentric cam, substantially as set forth.

5. In a rotary engine, the combination of a rotating piston, rotating in an inclosing housing, a back pressure plate impelled perpendicularly from a rotating hub by steam, impelled perpendicularly to a rotating hub by air, the pressure of which at beginning of stroke being initial steam pressure and gradually decreasing to atmospheric pressure at termination of stroke, substantially as set forth.

In testimony whereof I affix my signature in presence of two witnesses.

ARTHUR T. SNODGRASS.

Witnesses:
JAMES W. WALKER.
R. A. JONES.